(12) United States Patent
Pan et al.

(10) Patent No.: US 9,256,782 B2
(45) Date of Patent: Feb. 9, 2016

(54) APPARATUS AND METHOD FOR PROCESSING DOCUMENT IMAGE TO ESTIMATE LUMINANCE IMAGE FROM LUMINANCE COMPONENT IMAGE ADJUSTED ACCORDING TO ESTIMATED OR LARGEST LUMINANCE VALUES AND PREDETERMINED CRITERION

(71) Applicant: FUJITSU LIMITED, Kawasaki-shi, Kanagawa (JP)

(72) Inventors: Pan Pan, Beijing (CN); Yuan He, Beijing (CN); Jun Sun, Beijing (CN)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/613,710

(22) Filed: Feb. 4, 2015

(65) Prior Publication Data

US 2015/0235080 A1 Aug. 20, 2015

(30) Foreign Application Priority Data

Feb. 14, 2014 (CN) .......................... 2014 1 0051815

(51) Int. Cl.
*H04N 1/407* (2006.01)
*H04N 1/409* (2006.01)
*G06T 5/00* (2006.01)
*G06K 9/00* (2006.01)

(52) U.S. Cl.
CPC .............. *G06K 9/00442* (2013.01); *G06T 5/00* (2013.01); *G06T 5/008* (2013.01); *H04N 1/407* (2013.01); *H04N 1/4072* (2013.01)

(58) Field of Classification Search
None
See application file for complete search history.

(56) References Cited

U.S. PATENT DOCUMENTS

| 5,808,756 | A | * | 9/1998 | Matsuda | ................ | H04N 1/401 |
| | | | | | | 358/464 |
| 7,072,527 | B1 | * | 7/2006 | Nako | ....................... | G06K 9/32 |
| | | | | | | 358/474 |
| 7,733,548 | B2 | * | 6/2010 | Makino | .................. | H04N 1/387 |
| | | | | | | 358/520 |
| 8,235,543 | B2 | * | 8/2012 | Chuang | ................ | H04N 5/3572 |
| | | | | | | 358/461 |
| 2014/0093177 | A1 | * | 4/2014 | Hayashi | ............. | G06K 9/00442 |
| | | | | | | 382/199 |
| 2015/0163376 | A1 | * | 6/2015 | Pan | ...................... | H04N 1/4072 |
| | | | | | | 358/461 |

* cited by examiner

*Primary Examiner* — Scott A Rogers
(74) *Attorney, Agent, or Firm* — Staas & Halsey LLP

(57) ABSTRACT

An apparatus for and a method of processing a document image are provided. The method comprises: generating a luminance component image from the document image; estimating a luminance image from the luminance component image; and adjusting the luminance component image according to the estimated luminance image. Luminance values of pixels at least in horizontal edge areas of the luminance component image are estimated according to luminance values of pixels in a part of background of the luminance component image. If the estimated luminance values are acceptable according to a predetermined criterion, the luminance image is estimated according to the estimated luminance values. If the estimated luminance values are unacceptable, the luminance image is estimated by using the largest one of the luminance values of the pixels in each column of pixels in the luminance component image as the luminance values of all of the pixels in the column.

12 Claims, 9 Drawing Sheets

APPARATUS AND METHOD FOR PROCESSING DOCUMENT IMAGE TO ESTIMATE LUMINANCE IMAGE FROM LUMINANCE COMPONENT IMAGE ADJUSTED ACCORDING TO ESTIMATED OR LARGEST LUMINANCE VALUES AND PREDETERMINED CRITERION

CROSS REFERENCE TO RELATED APPLICATIONS

This application claims the benefit of Chinese Application No. 201410051815.2, filed Feb. 14, 2014, the disclosure of which is incorporated herein by reference.

TECHNICAL FIELD

The disclosure generally relates to a field of image processing, and particularly to an apparatus for processing a document image and a method of processing a document image to estimate a luminance image and adjust a luminance component image.

BACKGROUND ART

For a document image obtained through scanning or photographing, e.g. a document image scanned by an overhead scanner, since a document with fluctuations on a surface thereof is illuminated by a light source such as an LED of the scanner, the scanned image obtained possibly has a shadow. Due to the existence of the shadow, the quality of the image is deteriorated. Therefore, it is necessary to remove the shadow such that a background of the image is uniform.

The currently-used method of removing a shadow is to adjust, according to a luminance image estimated from a document image, precisely speaking, a luminance component image of the document image, an image intensity of a document image (i.e., the luminance component image), so as to remove the shadow, thereby obtaining a document image with a uniform background. Hereinafter, the fundamental principle of removing a shadow will be described in combination with equations (1) and (2). As shown in equation (1):

$$I_Y = L_Y R_Y \qquad (1)$$

where $I_Y$ represents an input image, $L_Y$ represents a luminance image, $R_Y$ represents a reflected image, and the subscript Y represents that the images are luminance component images.

Therefore, an image with a uniform background can be obtained from equation (2):

$$\tilde{I}_Y = cR_Y = \frac{cI_Y}{L_Y + \varepsilon} \qquad (2)$$

where c is a constant, which means an average image gray scale; and $\varepsilon$ is a very small constant, serving to prevent a denominator from being 0.

Figure 1:
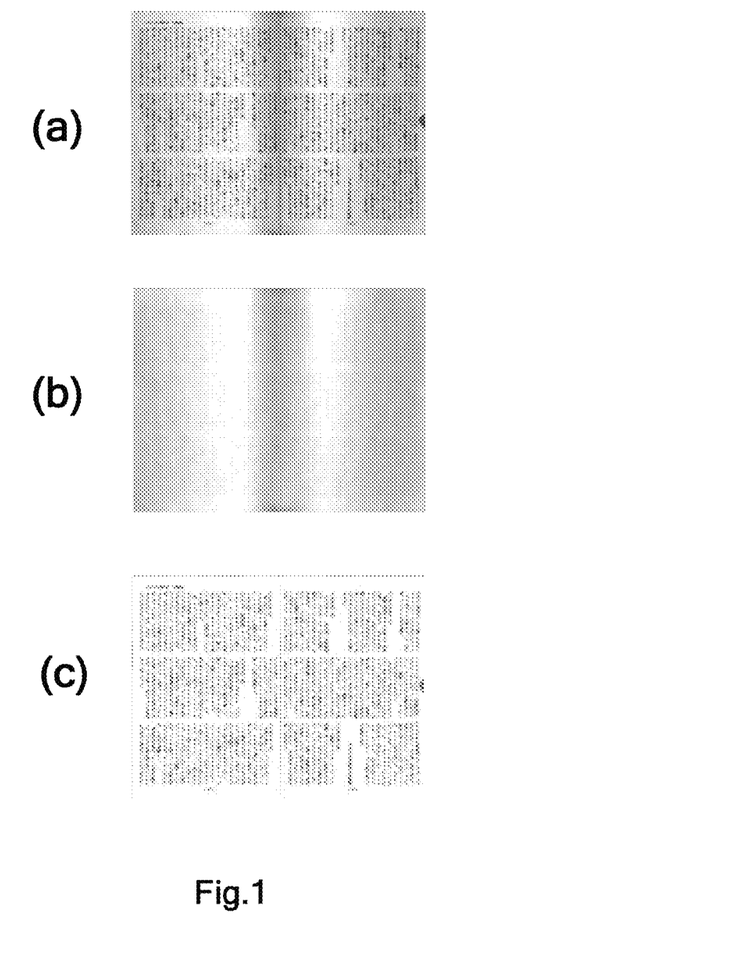
FIG. 1 is a view illustrating a luminance component image of a document image obtained through scanning, a luminance image estimated according to the luminance component image and an adjusted luminance component image after removal of a shadow.

FIG. 1 is a view illustrating a luminance component image of a document image obtained through scanning ((a) in FIG. 1), a luminance image estimated according to the luminance component image ((b) in FIG. 1) and an adjusted luminance component image after removal of a shadow ((c) in FIG. 1). It follows that obtaining an accurate luminance image performs the function of adjusting the luminance component image accurately, so as to perform shadow removal on the document image. At present, more and more attention is being drawn to the problem as to how to obtain a more accurate luminance image.

SUMMARY OF THE INVENTION

According to one aspect of the disclosure, an apparatus for processing a document image is provided, comprising: a generating unit for generating a luminance component image from the document image; an estimating unit for estimating a luminance image from the luminance component image; and an adjusting unit for adjusting the luminance component image according to the estimated luminance image. The estimating unit estimates luminance values of pixels at least in horizontal edge areas of the luminance component image according to luminance values of pixels in a part of background of the luminance component image. In addition, if the estimated luminance values of the pixels in the horizontal edge areas are determined as acceptable according to a predetermined criterion, the estimating unit estimates the luminance image according to the estimated luminance values; and if the estimated luminance values are determined as unacceptable according to the predetermined criterion, the estimating unit estimates the luminance image by using the largest one of the luminance values of the pixels in each column of pixels in the luminance component image as the luminance values of all of the pixels in the column.

According to an embodiment of the disclosure, the predetermined criterion may comprise: the estimated luminance values are determined as unacceptable if a large connected domain which cannot be determined as the background exists in the horizontal edge areas.

According to the embodiment of the disclosure, the predetermined criterion may comprise: the estimated luminance values are determined as unacceptable, if in one column of the pixels, a difference between the estimated luminance values of the pixels in the upper and lower horizontal edge areas exceeds a predetermined degree or value.

According to the embodiment of the disclosure, when a variance from the value of a pixel in the luminance component image to the value of the same pixel in an adjusted luminance component image exceeds a predetermined degree, the adjusting unit may output the luminance component image per se as a result of the adjustment.

According to the embodiment of the disclosure, when a variance from the value of a pixel in the luminance component image to the value of the same pixel in an adjusted luminance component image exceeds a predetermined degree, the adjusting unit may output the luminance component image suffered a gamma correction as a result of the adjustment.

According to another aspect of the disclosure, a method of processing a document image is provided, comprising: generating a luminance component image from the document image; estimating a luminance image from the luminance component image; and adjusting the luminance component image according to the estimated luminance image. Estimating a luminance image from the luminance component image comprises: estimating luminance values of pixels at least in horizontal edge areas of the luminance component image according to luminance values of pixels in a part of background of the luminance component image, and if the estimated luminance values of the pixels in the horizontal edge areas are determined as acceptable according to a predetermined criterion, estimating the luminance image according to the estimated luminance values, and if the estimated luminance values are determined as unacceptable according to the predetermined criterion, estimating the luminance image by using the largest one of the luminance values of the pixels in each column of pixels in the luminance component image as the luminance values of all of the pixels in the column.

The apparatus for and the method of processing a document image can adaptively adopt suitable manners of estimating a luminance image and adjusting a luminance component image, thereby producing a more satisfactory luminance component image, so as to further adjust the luminance component image more efficiently and obtain a more natural and comfortable visual effect.

BRIEF DESCRIPTION OF THE DRAWINGS

The above and other objects, features and advantages of the disclosure would be understood more easily with reference to the descriptions of the embodiments of the disclosure combined with the appended drawings below. In the appended drawings, identical or corresponding technical features or components will be denoted by using identical or corresponding reference signs. In the appended drawings, sizes and relative positions of units are not necessarily drawn in proportion.

DETAILED DESCRIPTION OF THE EMBODIMENTS

Embodiments of the disclosure will be described with reference to the appended drawings below. It should be noted that, for the sake of clarity, representations and descriptions of components and processing known to a person skilled in the art which are irrelevant to the disclosure are omitted in the appended drawings and descriptions thereof.

Figure 2:
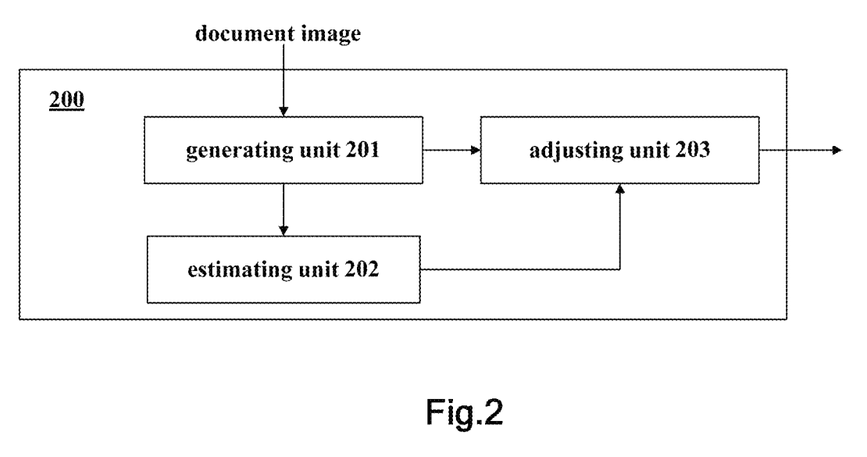
FIG. 2 is a structural block diagram illustrating an apparatus for processing a document image according to an embodiment of the disclosure.

FIG. 2 is a structural block diagram illustrating an apparatus 200 for processing a document image according to an embodiment of the disclosure. The apparatus 200 for processing a document image comprises a generating unit 201, an estimating unit 202 and an adjusting unit 203. The generating unit 201 is used for generating a luminance component image from the document image. The generating unit 201 may generate a luminance component image from the document image by adopting any well-known method in the art, which will not be stated redundantly herein. The estimating unit 202 is used for estimating a luminance image from the luminance component image generated by the generating unit 201. The adjusting unit 203 is used for adjusting the luminance component image received from the generating unit 201 by using the luminance image estimated by the estimating unit 202, and outputting the adjusted luminance component image as a result of adjustment.

For a document image in different typesetting forms which are obtained by performing scanning or photographing on different documents such as novels, caricature, magazines and so on, a more accurate result of luminance image estimation can be obtained by adopting corresponding methods of luminance image estimation. The design of the estimating unit 202 according to the embodiment of the disclosure right aims to provide adaptive luminance image estimation for different types of documents (according to luminance component images obtained), so as to enable a result of estimation to be more accurate.

Figure 3:
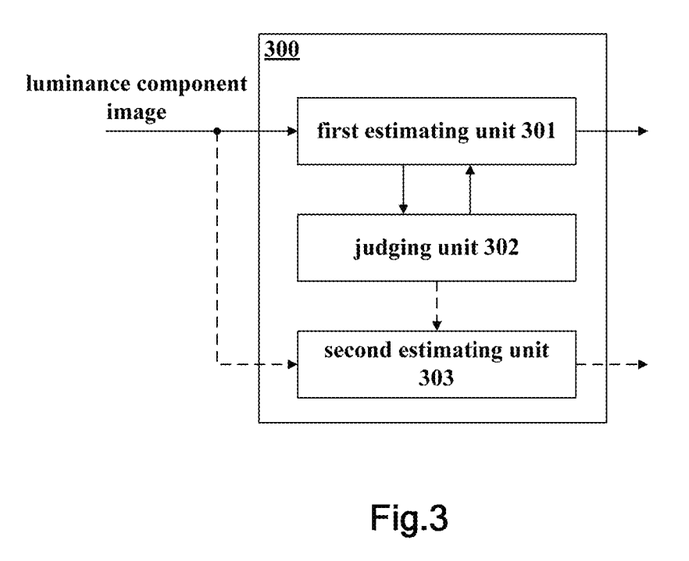
FIG. 3 is a block diagram illustrating a functional structure of an estimating unit according to the embodiment of the disclosure.

FIG. 3 is a block diagram illustrating a functional structure of an estimating unit 300 according to an embodiment of the disclosure. As shown in FIG. 3, the estimating unit 300 comprises a first estimating unit 301, a judging unit 302 and a second estimating unit 303. The units may be realized by hardware such as a FPGA, an integrated circuit chip and so on, may also be functional modules realized by computer software, and may also be realized by firmware combined from software and hardware. In addition, the units are possibly realized such that they are physically separated, and are also possibly integrated into a separate module.

The first estimating unit 301 receives the luminance component image generated by the generating unit, and is configured to estimate luminance values of pixels at least in horizontal edge areas of the luminance component image according to luminance values of pixels in a part of background of the received luminance component image.

A document image generally includes a content part ("content") such as text, picture and so on and a background part ("background") excluding content. After a luminance component image is generated from the document image, respective parts on the luminance component image correspond to the content part and the background part of the document image, respectively. Luminance values of pixels on background of the luminance component image are free of influences produced by ink, and can reflect the real luminance at a position thereof, so a luminance image may be estimated from the document image by using luminance values of pixels in a part of background of the luminance component image. In the embodiment according to the disclosure, luminance values of pixels in horizontal edge areas may be estimated first.

In one detailed example, the first estimating unit 301 first calculates a gradient map of the received luminance component image, and then performs binarization processing thereon. In a resultant binarized image, the first estimating unit 301 determines a connected domain which is possibly the background according to the luminance values. For example, assuming that the background corresponds to a largest connected domain of pixels having values representing high luminance or a combination of several largest connected domains in the luminance component image which has been subjected to the binarization processing, the first estimating unit 301 determines a position of the background by finding such a connected domain or a combination of connected domains, and then the first estimating unit 301 estimates luminance values of pixels in horizontal edge areas of the luminance component image according to luminance values of pixels in a part of the determined background of the luminance component image.

In other examples, prior to the determination of the background connected domain, "de-noising" and "expanding" processing may be performed on the binarized image, thereby making it possible to determine the background more accurately. The "expanding" processing herein refers to causing the content part to expand outwards properly, so as to reduce interferences of noise. In addition, sometimes, luminance values of associated areas such as areas neighboring the horizontal edge areas and so on are necessarily estimated first in order to estimate luminance values of pixels in the horizontal edge areas. Such a method of estimating luminance values of pixels which cannot be determined as the background by using luminance values of pixels which are determined as the background is also called a hole-filling method. A connected domain composed of the pixels which cannot be determined as the background is called a hole.

In general cases, edge areas of a document, for example upper and lower horizontal edge areas and vertical edges at both sides of a book, are relatively simple and generally contain no content. Therefore, it is credible to estimate a luminance image by using estimated luminance values of pixels in edge areas of a luminance component image.

In addition, changes in the luminance on the document image generally have different change rules along different directions. For example, luminance values of a luminance image of the document image possibly change more slightly along a certain direction than along another direction, which may be caused by several reasons. For example, due to illumination of scanner light sources (e.g. LEDs) or camera light sources arranged in a matrix or line shape, a regular change in the generated luminance values occurs. Or for example, for a luminance image of a document image obtained by scanning or photographing an opened book, luminance values change relatively slightly or do not change along a direction (which is generally a vertical direction) parallel to a gutter due to a curved shape of paper sheets when the book is opened. As can be seen from observations, for the document image obtained by scanning or photographing an opened book, the luminance of the document image along a vertical edge direction thereof generally changes relatively slightly or does not change, and comparatively speaking, the luminance of the document image changes relatively greatly along a horizontal edge direction thereof.

Thus, in view of the above-analyzed characteristics that the luminance of the document image changes more slightly along the vertical direction than along the direction of the horizontal edges and that luminance values in the edge areas are more reliable, the first estimating unit 301 may estimate the luminance image according to estimated luminance values of pixels in horizontal edge areas of the luminance component image.

Figure 4:
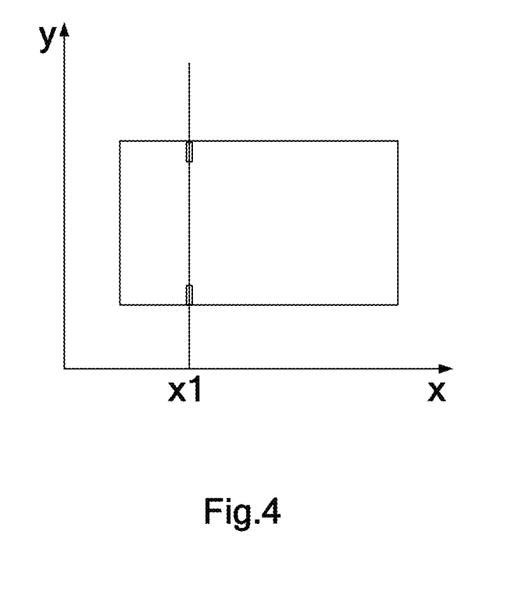
FIG. 4 is a schematic view illustrating estimating a luminance image according to luminance values of pixels in horizontal edge areas of the luminance component image according to the embodiment of the disclosure.

FIG. 4 is a schematic view illustrating estimating a luminance image according to luminance values of pixels in horizontal edge areas of the luminance component image according to the embodiment of the disclosure. In the example as shown in FIG. 4, for a book which is bound longitudinally, a direction to which upper and lower horizontal edges correspond is x direction, and a direction to which left and right edges correspond is y direction. The luminance in y direction changes slightly, so the luminance of other pixels on a straight line x=x1 may be estimated by using estimated luminance values of edge pixels at horizontal edges in parallel with x direction, for example estimated luminance values of edge pixels on the straight line x=x1 or an average value of estimated luminance values of several edge pixels. The portion surrounded by a rectangle on the straight line x=x1 as shown in FIG. 4 represents a position of pixels in the horizontal edge areas which may be used for luminance image estimation. For example, interpolation may be performed on the straight line x=x1 by using estimated luminance values (or an average value) of edge pixels on the straight line x=x1, thereby estimating luminance values of other pixels on the straight line x=x1.

Figure 5:
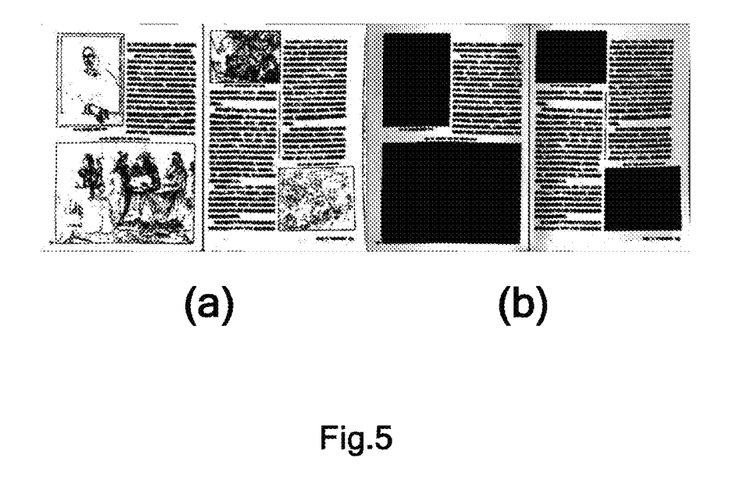
FIG. 5 is a schematic view for explaining the principle of a hole-filling method for estimating the luminance image.

FIG. 5 is a schematic view for explaining the principle of the hole-filling method for estimating luminance values of pixels in a connected domain which cannot be determined as the background by using luminance values of pixels in a connected domain which are determined as the background. The part (a) in FIG. 5 illustrates a gradient map of a document image obtained through scanning which has been subjected to binarization. Luminance information of a part of a background area in the document image can be determined directly, while luminance information of a part which cannot be determined as a background area such as text and illustrations should be obtained through estimation. Thus, in an intermediate step of acquiring a luminance image, all the parts such as text and illustrations become holes (black hollow holes), as shown by the part (b) in FIG. 5. The text part is a hole having a smaller size (a small hole), while the illustration part is a hole having a larger size (a large hole). During hole-filling, filling is performed on the respective holes by using proper luminance values. Either the same filling method or different filling methods may be adopted for the large hole and the small hole. Luminance values obtained through filling are generally regarded as being more unreliable for a hole having a larger size. A size standard of the "large hole" can be specified according to the actual requirements for reliability. For example, a hole having a height greater than or equal to ¼ of a total height of the document image may be regarded as a large hole.

According to one embodiment of the disclosure, after estimating luminance values of pixels in horizontal edge areas of the luminance component image, the first estimating unit 301 does not estimate the entire luminance image of the luminance component image immediately by using the estimated luminance values. Instead, after estimating luminance values of pixels in horizontal edge areas of the luminance component image, the first estimating unit 301 first outputs the obtained estimated luminance values in the edge areas to the judging unit 302, such that a most suitable luminance image estimation method can be selected adaptively so as to obtain a most accurate luminance image.

The judging unit 302 is configured to determine whether the luminance values of the pixels in the horizontal edge areas which are estimated by the first estimating unit 301 are acceptable according to a predetermined criterion. In addition, when the judging unit 302 determines the estimated luminance values as acceptable, the first estimating unit 301 is notified of a result that the estimated luminance values are acceptable, or an instruction to continue to operate is sent to the first estimating unit 301 directly. In response to a feedback from the judging unit 301, the first estimating unit 301 estimates the entire luminance image according to the estimated luminance values in the horizontal edge areas. For the specific estimation method, please refer to for example the method described with reference to FIG. 4. When the judging unit 302 determines the determined luminance values as unacceptable, operation of the first estimating unit 301 is stopped, while estimation of the second estimating unit 303 is started.

Due to existence of the judging unit 302, it is made possible to estimate the luminance image in such a manner that a most suitable luminance image estimation method can be selected adaptively.

According to the requirements of system, the judging unit 302 may perform determination of quality according to any predetermined criterion specified by a designer. For example, the following criterion may be adopted: the estimated luminance values are unacceptable, if in one column of the pixels, a difference between the estimated luminance values of the pixels in the upper and lower horizontal edge areas exceeds a predetermined degree or value. For example, if in one column of the pixels, a difference between the estimated luminance values of the pixels in the upper and lower horizontal edge areas is greater than a certain predetermined threshold, the estimated luminance values are determined as unacceptable. Specifically, for example, if the luminance values are represented by values within a range from 0 to 255, the threshold for example may be set to be from 50 to 70. In a detailed example, if in any column of the pixels, a difference between the estimated luminance values of any two upper and lower pixels is greater than a preset threshold (e.g. 60), the judging unit 302 may determine the estimated luminance values as unacceptable. In another example, the requirements are relaxed slightly in such a way that when there are continuous pixel columns, if differences between the luminance values of upper and lower pixels thereon are all greater than a preset threshold, the judging unit 302 may determine the estimated luminance values as unacceptable. In other words, in this example, if there exists only a plurality of discrete columns, on which a difference between the estimated luminance values of pixels in horizontal edge areas is greater than a preset threshold, the judging unit 302 may determine the estimated luminance values as acceptable. Alternatively, instead of comparing the difference between the estimated luminance values with the preset threshold, a change rate obtained by dividing an absolute value of a difference between the estimated luminance values (or an average value thereof) of pixels at the upper and lower horizontal edges by one of the estimated luminance values (or an average value thereof) of the pixels at the upper and lower horizontal edges is compared with a preset change rate threshold, so as to determine whether the difference between the estimated luminance values of the pixels in the upper and lower horizontal pixel areas exceeds a predetermined degree.

In addition, the judging unit 302 may also perform the determination by adopting the following criterion: in a case where a large connected domain (i.e., a large hole) which cannot be determined as the background exists in the horizontal edge areas of the luminance component image, the judging unit 302 may determine the estimated luminance values as unacceptable. According to the disclosure, the "horizontal edge areas" refer to a set of a predetermined number of rows closest to the upper and lower horizontal edges in the luminance component image which are preset to be used for estimating the entire luminance image. For example, if it is preset in the judging unit 302 that the estimated luminance values of the uppermost 10 rows and the lowermost 10 rows of pixels in the luminance component image are to be used for estimating the entire luminance image, the "horizontal edge areas" refer to a set of the uppermost 10 rows of the pixels and the lowermost 10 rows of the pixels. No matter how many rows the horizontal edge areas are set to include, as long as there exist large holes on several rows thereamong, the judging unit 302 determines the estimated luminance values as unacceptable. A size of a hole is determined from a height thereof. For example, a hole having a height greater than or equal to ¼ of a total height of the luminance image may be determined as a large hole.

In one example, when the estimating unit 301 is configured to estimate the luminance image by using estimated luminance values of pixels of horizontal edge rows (i.e., pixels of the uppermost row and pixels of the lowermost row) of the luminance component image, the judging unit 302 may be configured to determine in the following manner that a large hole exists in the horizontal edge areas: there exists a large hole in the uppermost row of the pixels or/and the lowermost row of the pixels. In another example, when the estimating unit 301 is configured to estimate the luminance image by using an average value of estimated luminance values of pixels of predetermined rows in horizontal edge areas of the luminance component image, the judging unit 302 may be configured to determine in the following manner that a large hole exists in the horizontal edge areas: a portion of the large hole is located in several rows of predetermined rows in the horizontal edge areas.

The judgment performed by adopting this criterion may be performed by the judging unit 302 before performing hole-filling processing on the horizontal edge areas of the luminance component image, so it is made possible to improve system efficiency and reduce calculation cost.

Of course, the aforementioned two criteria may also be adopted in the same embodiment. For example, in a case where it is determined that no large hole exists in the horizontal edge areas, luminance values in the horizontal edge areas are estimated by using luminance values of pixels in a part of background of the luminance component image. After the estimation is performed, it is determined whether the difference between the luminance values in the upper and lower horizontal edge areas (e.g. the uppermost row and the lowermost row) is greater than a predetermined degree.

When the judging unit 302 determines the estimated luminance values input by the first estimating unit 301 as unacceptable, the operation of the second estimating unit 303 is started. The second estimating unit 303 estimates the luminance image by using the largest one of the luminance values of the pixels in each column of pixels in the luminance component image as the luminance values of all of the pixels in the column, thereby effecting adaptive selection of the estimation method of the luminance image.

In general cases, each document image contains a paper sheet (containing a shadow or containing no shadow) and ink (containing content such as text, picture and so on). Each pixel on the document image either belongs to a pixel of the paper sheet or belongs to a pixel of the ink. If the luminance image is taken into account row by row, it is assumed that a luminance value of each row is equal. It is further assumed that for each row at least one pixel belongs to the paper sheet (rather than the ink), so luminance values of the brightest pixels are regarded as corresponding to luminance values of the paper sheet without a shadow. Based upon the above assumptions, the second estimating unit 303 may estimate the luminance image by using the largest one of the luminance values of the pixels in each column of pixels in the luminance component image as the luminance values of all of the pixels in the column.

For a case where a single column of pixels on an individual document image all belong to the ink, as long as it is not the case that continuous columns are fully covered by the ink, the estimation method of the second estimating unit 303 may also be adopted. It is only necessary to adopt in the second estimating unit 303 a smoothing technique to recover these lacked columns.

Figure 6:
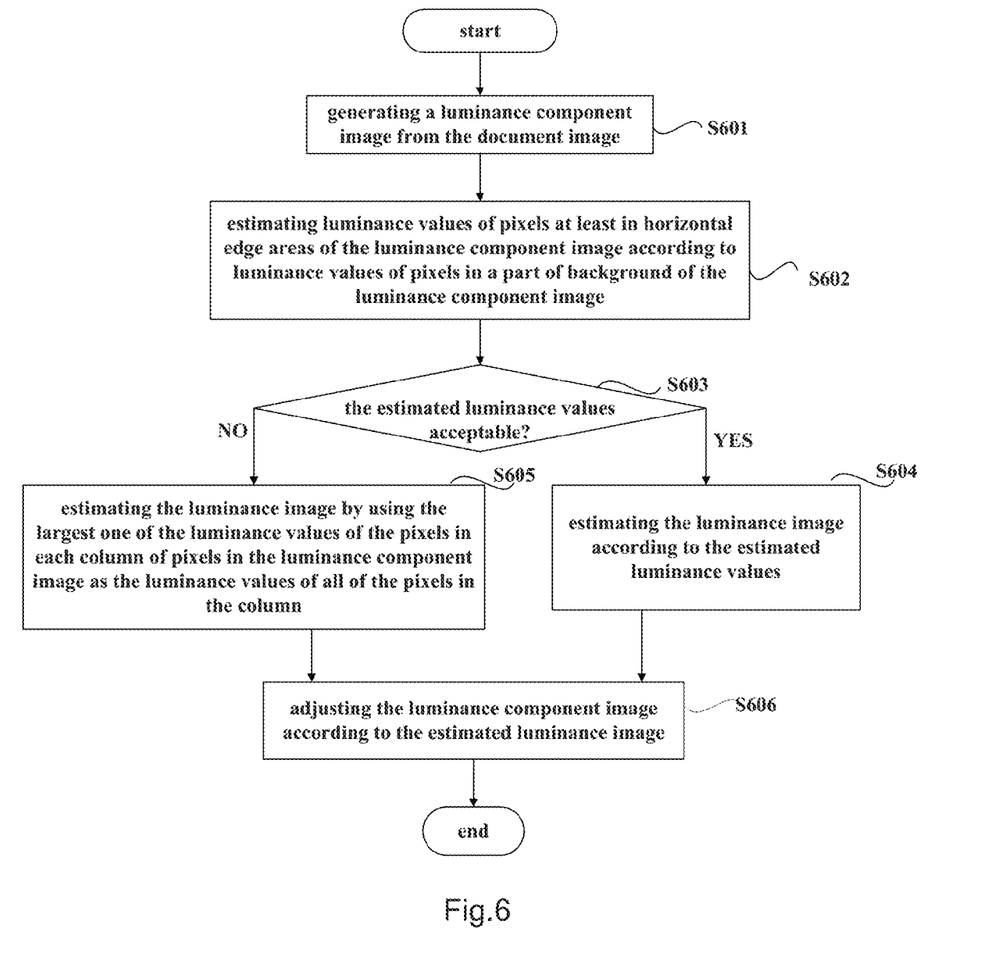
FIG. 6 is a flowchart illustrating a method of processing a document image according to the embodiment of the disclosure.

FIG. 6 is a flowchart illustrating document image processing performed by the apparatus for processing a document image according to the embodiment of the disclosure. With reference to the embodiment as shown in FIG. 2, in Step S601, the generating unit 201 generates a luminance component image from the document image. The luminance component image may be generated by adopting various well-known methods in the art.

In step S602, the estimating unit 202 estimates luminance values of pixels at least in horizontal edge areas of the luminance component image according to luminance values of pixels in a part of background of the luminance component image. As described above, luminance values of pixels at least in horizontal edge areas of the luminance component image may be estimated by the method of hole-filling. The specific method has been described above by way of examples, and will not be stated redundantly herein.

In step S603, the estimating unit 202 determines according to a predetermined criterion whether the luminance values estimated in the step S602 are acceptable. The predetermined criterion may be: the estimated luminance values are determined as unacceptable if a large connected domain (a large hole) which cannot be determined as the background exists in the horizontal edge areas. A definition of the large hole may be determined by a designer as needed. Alternatively, the predetermined criterion may also be: the estimated luminance values are determined as unacceptable, if in one column of the pixels, a difference between the estimated luminance values of the pixels in the upper and lower horizontal edge areas exceeds a predetermined degree.

If the estimating unit 202 determines the estimated luminance values as acceptable ("YES" in the step S603), the processing proceeds to step S604. In the step S604, the estimating unit 202 estimates the luminance image according to the estimated luminance values.

For example, in one embodiment, when it is determined in the step S603 that a difference between the luminance values of the pixels in the upper and lower edge areas which is estimated by the hole-filling method does not exceed a predetermined degree, the estimated luminance values are determined as acceptable. Thus, the processing proceeds to step S604, in which other portions of the luminance image are estimated by using the luminance values of the pixels in the horizontal edge areas which have been subjected to the hole filling.

If the estimating unit 202 determines the estimated luminance values as unacceptable ("NO" in the step S603), the processing proceeds to step S605. In the step S605, the luminance image is estimated by using the largest one of the luminance values of the pixels in each column of pixels as the luminance values of all of the pixels in the column.

Upon completion of the estimation of the luminance image in the step S604 or the step S605, the processing proceeds to step S606. In the step S606, the luminance component image is adjusted according to the estimated luminance image. Then, the processing ends.

Returning back to FIG. 3, no matter whether the first estimating unit 301 or the second estimating unit 303 is used to perform the estimation of the luminance image, the estimating unit will output a result of estimation to an adjusting unit, e.g. the adjusting unit 203 as shown in FIG. 2. The luminance component image is adjusted by the adjusting unit 203 according to the estimated luminance image. The inventor would appreciate that the adjustment performed on the luminance component image of the document image should be orientated to users. That is, it is required to enable a result of adjustment of the luminance component image to provide the users with a comfortable and natural visual feeling. Thus, in order to enable the adjusted luminance component image which is output as the result of adjustment to provide the users with an excellent visual feeling without producing an unnatural result, the adjusting unit 203 may also have a further verification function.

Figure 7:
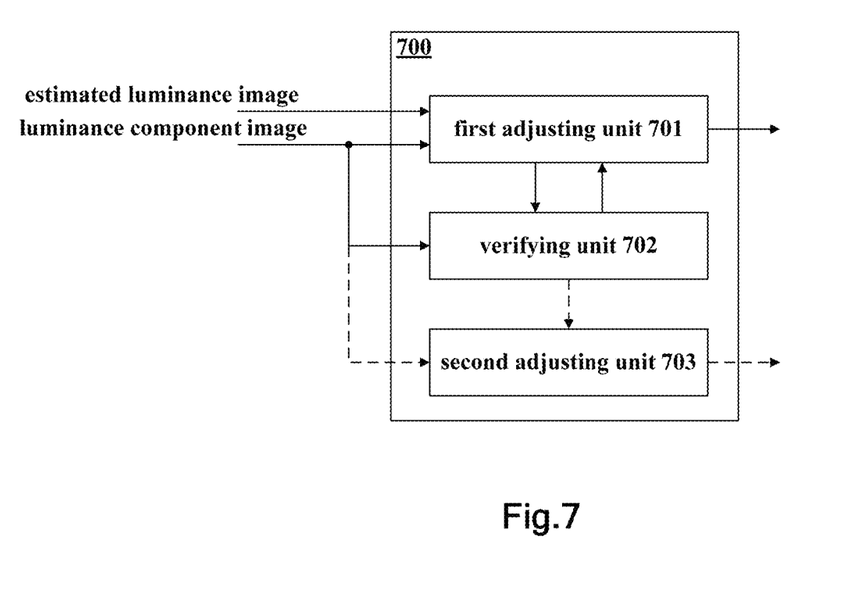
FIG. 7 is a block diagram illustrating a functional structure of an adjusting unit according to the embodiment of the disclosure.

FIG. 7 is a block diagram illustrating a functional structure of an adjusting unit 700 according to the embodiment of the disclosure. A first adjusting unit 701 adjusts a luminance component image input from the generating unit according to a luminance image input from the estimating unit. The first adjusting unit 701 may perform the adjustment in any well-known manner in the art. Then, a result of adjustment is input to a verifying unit 702.

The verifying unit 702 determines whether a variance from the value of a pixel in the luminance component image which is originally input to the value of the same pixel in an adjusted luminance component image exceeds a predetermined degree. For example, the variance from the value of the pixel in the luminance component image which is originally input to the value of the same pixel in the adjusted luminance component image may be represented as R=abs (inimg[x,y]−outimg[x,y])/inimg[x,y], wherein "abs" represents an absolute value operation, "inimg[x,y]" represents a value of the luminance component image which is originally input at a position (x, y), and "outimg[x,y]" represents a value of the adjusted luminance component image at the position (x, y). For example, a threshold of the variance R may be set to be between 1.0 and 2.0.

In one embodiment, if the largest one of variances R corresponding to all positions is greater than a threshold, the verifying unit 702 may determine that the variance from the value of the pixel in the luminance component image which is originally input to the value of the same pixel in the adjusted luminance component image exceeds a predetermined degree, and otherwise determine that it does not exceed a predetermined degree. In another embodiment, only when more than a specific number (N) of ones of variances R corresponding to all positions are greater than the threshold, the verifying unit 702 determines that the variance from the value of the pixel in the luminance component image which is originally input to the value of the same pixel in the adjusted luminance component image exceeds a predetermined degree, and otherwise determines that it does not exceed a predetermined degree.

When the verifying unit 702 determines that a variance from the value of a pixel in the original luminance component image to the value of the same pixel in an adjusted luminance component image does not exceed a predetermined degree, the adjusting unit 700 may output the result of the adjustment by the first adjusting unit 701 directly as a final adjusted luminance component image.

When the verifying unit 702 determines that a variance from the value of a pixel in the original luminance component image to the value of the same pixel in an adjusted luminance component image exceeds a predetermined degree (or that there are greater than N pixels of which the value variances exceed a predetermined degree), operation of the second adjusting unit 703 is started.

In one embodiment, the second adjusting unit 703 performs no processing on the luminance component image received from the generating unit, but outputs it directly as a result of the adjustment by the adjusting unit 700. In this case, the second adjusting unit 703 may be embodied as a storage device in the adjusting unit 700 simply, for storing the luminance component image generated by the luminance component generating unit, and the original luminance component image stored is read therefrom by the adjusting unit 700 in response to a verification result that the variance to the adjusted luminance component image exceeds a range.

In another embodiment, in response to the verification result that the variance to the adjusted luminance component image exceeds a range which is made by the verifying unit 702, the second adjusting unit 703 performs a gamma correction processing on the luminance component image which is originally input. Then, the luminance component image suffered the gamma correction is output as a result of the adjustment by the adjusting unit 700. Through the gamma correction, a shadow on the luminance component image is weakened.

Figure 8:
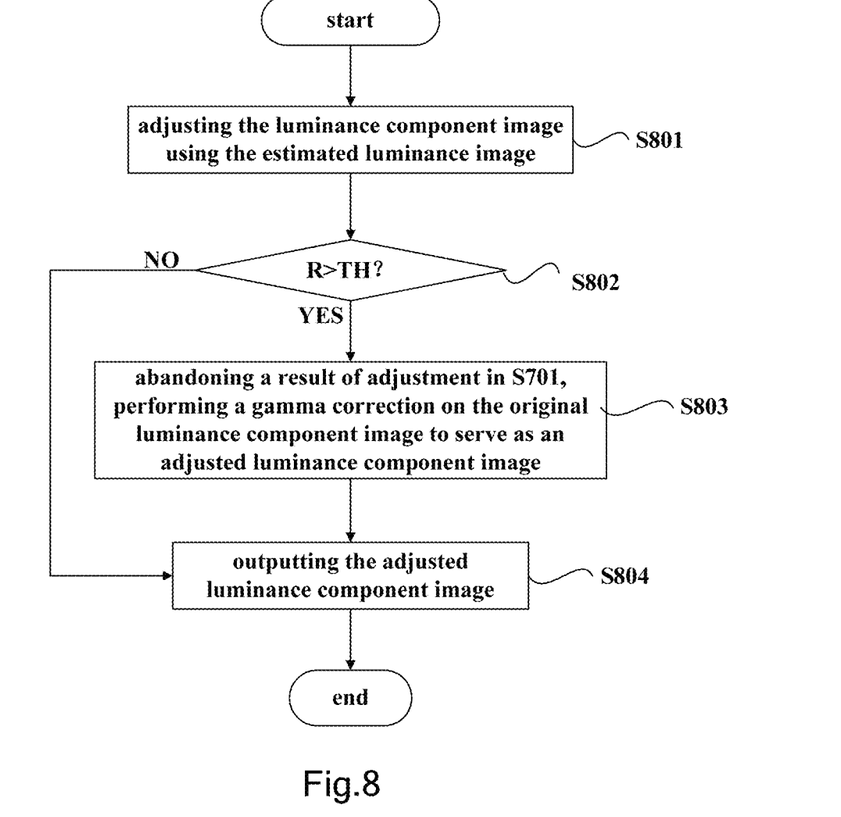
FIG. 8 is a flowchart illustrating adjustment processing of the luminance component image according to the embodiment of the disclosure.

FIG. 8 is a flowchart illustrating adjustment processing of the luminance component image according to the embodiment of the disclosure. With reference to the embodiment as shown in FIG. 2, in step S801, the adjusting unit 203 adjusts the luminance component image by using the luminance image estimated by the estimating unit 202.

In step S802, the adjusting unit 203 determines whether a variance (e.g. a change rate R) between the value of a pixel in an adjusted luminance component image and the value of the same pixel in the original luminance component image exceeds a predetermined degree (a predetermined threshold TH).

If it is determined in the step S802 that a variance between the value of a pixel in the luminance component image and the value of the same pixel in the original luminance component image does not exceed a predetermined degree ("NO" in the step S802), the step proceeds to step S804. In the step S804, the adjusted luminance component image obtained in the step S801 is output as a result of adjustment. Then, the processing ends.

If it is determined in the step S802 that a variance between the value of a pixel in the luminance component image and the value of the same pixel in the original luminance component image exceeds a predetermined degree ("YES" in the step S802), the step proceeds to step S803. In the step S803, a result of adjustment in the step S801 is abandoned, and for example a gamma correction is performed on the original luminance component image, so as to weaken the shadow in the luminance component image. Then, the proceeding proceeds to the step S804.

In the step S804, the luminance component image suffered the gamma correction is output as a result of the adjustment. Then, the processing ends.

Figure 9:
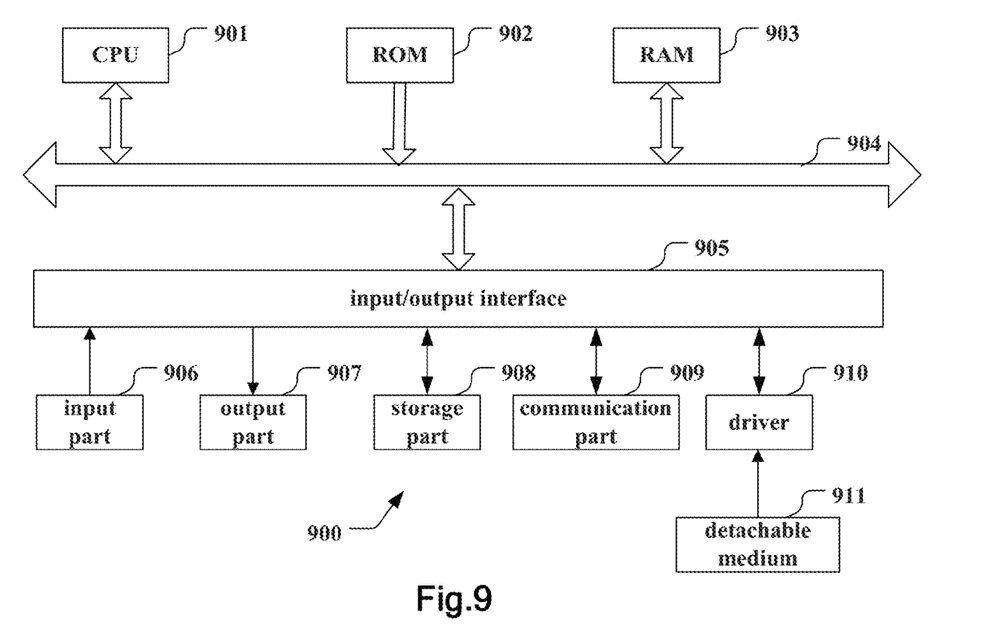
FIG. 9 is a block diagram illustrating an exemplary structure of a computer implementing the disclosure contents.

FIG. 9 is a block diagram illustrating an exemplary structure of a computer carrying out the disclosure contents. In FIG. 9, a Central Processing Unit (CPU) 901 performs various processing according to a program stored in a Read-Only Memory (ROM) 902 or a program uploaded from a storage part 908 to a Random Access Memory (RAM) 903. In the RAM 903, data needed when the CPU 901 performs various processing is also stored as requirements.

The CPU 901, the ROM 902 and the RAM 903 are connected to each other via a bus 904. An input/output interface 905 is also connected to the bus 904.

The following components are connected to the input/output interface 905: an input part 906, including a keyboard, a mouse and so on; an output part 907, including a display, such as a Cathode Ray Tube (CRT), a Liquid Crystal Display (LCD) and so on, as well as a loudspeaker and so on; the storage part 908, including a hard disk and so on; and a communication part 909, including network interface card such as an LAN card, a modem and so on. The communication part 909 performs communication processing over a network such as Internet.

According to requirements, a driver 910 is also connected to the input/output interface 905. A detachable medium 911 such as a magnetic disk, an optical disk, a magneto-optical disk, a semiconductor memory and so on is installed on the driver 910 according to requirements, such that a computer program read therefrom is installed in the storage part 908 as requirements.

In the case of carrying out the above steps and processing by software, a program constituting the software is installed from a network such as Internet or a storage medium such as the detachable medium 911.

A person skilled in the art would appreciate that such a storage medium is not limited to the detachable medium 911 storing a program and distributed separately from the method to provide the program to a user as shown in FIG. 9. Examples of the detachable medium 911 include a magnetic disk, an optical disk (including a DC Read-Only Memory (CD-ROM) and a Digital Versatile Disk (DVD)), a magneto-optical disk (including a Mini Disk (MD)) and a semiconductor memory. Or, the storage medium may be a hard disk included in the ROM 902 and the storage part 908, etc., in which a program is stored, and which is distributed together with the method including it to a user.

The disclosure further proposes a program product storing a machine-readable instruction code. When being read and executed by a machine, the instruction code may carry out the above method according to the embodiment of the disclosure.

Correspondingly, a storage medium for carrying out the program product storing a machine-readable instruction code is also included in the disclosure of the disclosure. The storage medium includes but is not limited to a floppy disk, an optical disk, a magneto-optical disk, a memory card, a memory stick, etc.

In addition, some methods and apparatuses for combination tools according to the embodiments of the disclosure can broaden a use range of a combination.

A person ordinarily skilled in the art would appreciate that the examples listed herein are exemplary, and the disclosure is not limited thereto.

As an example, the respective steps of the above method embodiment and the respective constituent modules and/or units of the above apparatus embodiment may be embodied as software, firmware, hardware or combinations thereof, and serve as a part of a corresponding apparatus. The specific means or manner that can be used when configuring the respective constituent modules and units in the above apparatus by software, firmware, hardware or a combination thereof are well-known to a person skilled in the art, and will not be redundantly described herein, As an example, in the case of implementation by software or firmware, a program constituting the software may be installed into a computer having a dedicated hardware structure (for example the universal computer 900 as shown in FIG. 9) from a storage medium or a network. When being installed with various programs, the computer can perform various functions and so on.

In the above descriptions of the detailed embodiments of the disclosure, features described and/or shown for one embodiment may be used according to the same or similar way in one or more other embodiments, be combined with features in other embodiments, or substitute features in other embodiments.

It should be emphasized that the term "comprise/include" when used in the text refers to existence of a feature, an element, a step or an assembly, but does not exclude existence or addition of one or more other features, elements, steps or assemblies.

In addition, the method according to the disclosure is not limited to be carried out in the temporal order described in the description, but may also be carried out sequentially, in parallel or independently in other temporal orders. Therefore, the order of carrying out the method described in the disclosure fails to constitute a limitation to the technical scope of the disclosure.

Although the disclosure is already disclosed above by the descriptions of the embodiments of the disclosure, it should be understood that a person skilled in the art can design various modifications, improvements or equivalents on the disclosure within the spirit and the scope of the appended claims. The modifications, improvements or equivalents shall also be regarded as being within the scope of protection of the disclosure.

The disclosure may also be carried out according to the following embodiments:

1. An apparatus for processing a document image, comprising:
    a generating unit for generating a luminance component image from the document image;
    an estimating unit for estimating a luminance image from the luminance component image; and
    an adjusting unit for adjusting the luminance component image according to the estimated luminance image,
    wherein, the estimating unit estimates luminance values of pixels at least in horizontal edge areas of the luminance component image according to luminance values of pixels in a part of background of the luminance component image, and if the estimated luminance values of the pixels in the horizontal edge areas are determined as acceptable according to a predetermined criterion, the estimating unit estimates the luminance image according to the estimated luminance values, and if the estimated luminance values are determined as unacceptable according to the predetermined criterion, the estimating unit estimates the luminance image by using the largest one of the luminance values of the pixels in each column of pixels in the luminance component image as the luminance values of all of the pixels in the column.

2. The apparatus for processing a document image according to embodiment 1, wherein, the predetermined criterion comprising: the estimated luminance values are determined as unacceptable if a large connected domain which cannot be determined as the background exists in the horizontal edge areas.

3. The apparatus for processing a document image according to embodiment 1 or 2, wherein, the predetermined criterion comprising: the estimated luminance values are determined as unacceptable, if in one column of the pixels, a difference between the estimated luminance values of the pixels in the upper and lower horizontal edge areas exceeds a predetermined degree.

4. The apparatus for processing a document image according to any one of embodiments 1 to 3, wherein, when a variance from the value of a pixel in the luminance component image to the value of the same pixel in an adjusted luminance component image exceeds a predetermined degree, the adjusting unit outputs the luminance component image per se as a result of the adjustment.

5. The apparatus for processing a document image according to any one of embodiments 1 to 3, wherein, when a variance from the value of a pixel in the luminance component image to the value of the same pixel in an adjusted luminance component image exceeds a predetermined degree, the adjusting unit outputs the luminance component image suffered a gamma correction as a result of the adjustment.

6. A method of processing a document image, comprising:
    generating a luminance component image from the document image;
    estimating a luminance image from the luminance component image; and
    adjusting the luminance component image according to the estimated luminance image,
    wherein, luminance values of pixels at least in horizontal edge areas of the luminance component image are estimated according to luminance values of pixels in a part of background of the luminance component image, and if the estimated luminance values of the pixels in the horizontal edge areas are determined as acceptable according to a predetermined criterion, the luminance image is estimated according to the estimated luminance values, and if the estimated luminance values are determined as unacceptable according to the predetermined criterion, the luminance image is estimated by using the largest one of the luminance values of the pixels in each column of pixels in the luminance component image as the luminance values of all of the pixels in the column.

7. The method of processing a document image according to embodiment 6, wherein, the predetermined criterion comprising: the estimated luminance values are determined as unacceptable if a large connected domain which cannot be determined as the background exists in the horizontal edge areas.

8. The method of processing a document image according to embodiment 6 or 7, wherein, the predetermined criterion comprising: the estimated luminance values are determined as unacceptable, if in one column of the pixels, a difference between the estimated luminance values of the pixels in the upper and lower horizontal edge areas exceeds a predetermined degree.

9. The method of processing a document image according to any one of embodiments 6 to 8, wherein, when a variance from the value of a pixel in the luminance component image to the value of the same pixel in an adjusted luminance component image exceeds a predetermined degree, the luminance component image per se is output as a result of the adjustment.

10. The method of processing a document image according to any one of embodiments 6 to 8, wherein, when a variance from the value of a pixel in the luminance component image to the value of the same pixel in an adjusted luminance component image exceeds a predetermined degree, the luminance component image suffered a gamma correction is output as a result of the adjustment.

What is claimed is:

1. An apparatus for processing a document image, comprising:
    a generating unit to generate a luminance component image from the document image;
    an estimating unit to estimate a luminance image from the luminance component image; and
    an adjusting unit to adjust the luminance component image according to the luminance image estimated,
    wherein, the estimating unit estimates luminance values of pixels at least in horizontal edge areas of the luminance component image according to luminance values of pixels in a part of a background of the luminance component image, and if the estimated luminance values of the pixels in the horizontal edge areas are determined as acceptable according to a predetermined criterion, the estimating unit estimates the luminance image according to the estimated luminance values, and if the estimated luminance values are determined as unacceptable according to the predetermined criterion, the estimating unit estimates the luminance image by using a largest one of the luminance values of the pixels in each column of pixels in the luminance component image as the luminance values of all of the pixels in that column.

2. The apparatus for processing a document image according to claim 1, wherein, the predetermined criterion comprising: the estimated luminance values are determined as unacceptable if a large connected domain which cannot be determined as the background exists in the horizontal edge areas.

3. The apparatus for processing a document image according to claim 1, wherein, the predetermined criterion comprising: the estimated luminance values are determined as unacceptable, if in one column of the pixels, a difference between the estimated luminance values of the pixels in upper and lower horizontal edge areas exceeds a predetermined value.

4. The apparatus for processing a document image according to claim 2, wherein, the predetermined criterion comprising: the estimated luminance values are determined as unacceptable, if in one column of the pixels, a difference between the estimated luminance values of the pixels in upper and lower horizontal edge areas exceeds a predetermined value.

5. The apparatus for processing a document image according to claim 1, wherein, when a variance from a value of a pixel in the luminance component image to the value of a same pixel in an adjusted luminance component image exceeds a predetermined value, the adjusting unit outputs the luminance component image as an adjustment result.

6. The apparatus for processing a document image according to claim 1, wherein, when a variance from a value of a pixel in the luminance component image to the value of a same pixel in an adjusted luminance component image exceeds a predetermined value, the adjusting unit outputs the luminance component image with a gamma correction as an adjustment result.

7. A method of processing a document image, comprising:
generating a luminance component image from the document image;
estimating a luminance image from the luminance component image; and
adjusting the luminance component image according to the luminance image estimated,
wherein, luminance values of pixels at least in horizontal edge areas of the luminance component image are estimated according to luminance values of pixels in a part of a background of the luminance component image, and if the estimated luminance values of the pixels in the horizontal edge areas are determined as acceptable according to a predetermined criterion, the luminance image is estimated according to the estimated luminance values, and if the estimated luminance values are determined as unacceptable according to the predetermined criterion, the luminance image is estimated by using a largest one of the luminance values of the pixels in each column of pixels in the luminance component image as the luminance values of all of the pixels in that column.

8. The method of processing a document image according to claim 7, wherein, the predetermined criterion comprising: the estimated luminance values are determined as unacceptable if a large connected domain which cannot be determined as the background exists in the horizontal edge areas.

9. The method of processing a document image according to claim 7, wherein, the predetermined criterion comprising: the estimated luminance values are determined as unacceptable, if in one column of the pixels, a difference between the estimated luminance values of the pixels in upper and lower horizontal edge areas exceeds a predetermined value.

10. The method of processing a document image according to claim 8, wherein, the predetermined criterion comprising: the estimated luminance values are determined as unacceptable, if in one column of the pixels, a difference between the estimated luminance values of the pixels in upper and lower horizontal edge areas exceeds a predetermined value.

11. The method of processing a document image according to claim 7, wherein, when a variance from a value of a pixel in the luminance component image to the value of a same pixel in an adjusted luminance component image exceeds a predetermined value, the luminance component image is output as an adjustment result.

12. The method of processing a document image according to claim 7, wherein, when a variance from a value of a pixel in the luminance component image to the value of a same pixel in an adjusted luminance component image exceeds a predetermined value, the luminance component image with a gamma correction is output as an adjustment result.

\* \* \* \* \*